United States Patent
Swindells et al.

(10) Patent No.: US 7,334,041 B2
(45) Date of Patent: Feb. 19, 2008

(54) VEHICLE COMMUNICATIONS INTERFACE

(75) Inventors: Robert J. Swindells, Manchester (GB); Christopher Roberts, Timperley (GB)

(73) Assignee: Teradyne, Inc., North Reading, MA (US)

( * ) Notice: Subject to any disclaimer, the term of this patent is extended or adjusted under 35 U.S.C. 154(b) by 882 days.

(21) Appl. No.: 10/787,687

(22) Filed: Feb. 26, 2004

(65) Prior Publication Data

US 2005/0193087 A1   Sep. 1, 2005

(51) Int. Cl.
 *G06F 15/173* (2006.01)
(52) U.S. Cl. .................. 709/230; 709/218; 709/249; 709/250; 710/315; 701/33
(58) Field of Classification Search ................ 709/218, 709/230, 249, 250; 710/315; 701/29, 33
See application file for complete search history.

(56) References Cited

U.S. PATENT DOCUMENTS

| | | | | |
|---|---|---|---|---|
| 5,737,711 A * | 4/1998 | Abe | .................. | 701/29 |
| 6,526,340 B1 * | 2/2003 | Reul et al. | .................. | 701/29 |
| 6,662,087 B1 * | 12/2003 | Liebl et al. | .................. | 701/29 |
| 6,978,198 B2 * | 12/2005 | Shi | .................. | 701/33 |
| 7,152,133 B2 * | 12/2006 | McClure et al. | .................. | 710/315 |
| 2001/0025323 A1 * | 9/2001 | Sodergren | .................. | 709/230 |
| 2003/0004623 A1 * | 1/2003 | Namaky et al. | .................. | 701/29 |
| 2003/0065432 A1 * | 4/2003 | Shuman et al. | .................. | 701/48 |
| 2003/0167345 A1 * | 9/2003 | Knight et al. | .................. | 709/249 |
| 2004/0111188 A1 * | 6/2004 | McClure et al. | .................. | 701/1 |
| 2005/0090940 A1 * | 4/2005 | Pajakowski et al. | .................. | 701/1 |
| 2005/0177286 A1 * | 8/2005 | Namaky et al. | .................. | 701/33 |

OTHER PUBLICATIONS

Intel in Communications, "Intel IXP420 Network Processor", Product Brief, 2004.

* cited by examiner

*Primary Examiner*—Oanh Duong
(74) *Attorney, Agent, or Firm*—Chester Cekala

(57) ABSTRACT

An improved vehicle communications interface (VCI) is both economical and readily adaptable for running new software. The improved VCI includes a server coupled to a bank of processors. The server can communicate with a host, and the processors can communicate with different vehicle networks. Each processor includes a state machine and a media access controller for a particular vehicle network. The state machine identifies incoming messages that require real time responses and provides the requisite responses directly back to the network, without involvement of the server. Real time requirements of the server are thus relieved, allowing the server to run a non-real time, mainstream operating system for which new product software is readily available.

21 Claims, 6 Drawing Sheets

VEHICLE COMMUNICATIONS INTERFACE

CROSS-REFERENCES TO RELATED APPLICATIONS

Not Applicable.

STATEMENT REGARDING FEDERALLY SPONSORED RESEARCH OR DEVELOPMENT

Not Applicable.

Reference to Microfiche Appendix

Not Applicable

BACKGROUND OF THE INVENTION

1. Field of the Invention

This invention relates generally to diagnostic testing of computers and computer networks in transportation vehicles, and, more particularly, to an improved device and method for communicating with an automobile's internal computer networks.

2. Description of Related Art

Modern transportation vehicles, such as automobiles, increasingly employ computer systems for managing communications, safety, and control. New automobiles typically contain 30 or 40 different computers. These computers are generally linked together to form one or more computer networks. An automobile's computers communicate over these networks via various network protocols. Different types of automobiles employ different protocols, which are generally proprietary to the automobile's manufacturer. Examples of automotive network protocols include CAN, UART, or SAE J1850.

Technicians require access to an automobile's computer networks to configure the automobile's computers and to run diagnostics. Access is provided via one or more access ports, which are generally located under the dashboard. The access ports are physical connectors that are accessible to a technician and provide taps into the automobile's networks. An external device can be connected to the access port. Under a technician's control, the device can be made to interact with the automobile's networks, or any of its computers, according to the respective network protocols. Diagnostic information can therefore be acquired. The device is generally programmable for configuring the automobile's computers, or for running a test program on the automobile's networks, computers, and/or the functional subassemblies that the computers control. Information about the status and operation of the automobile can be read back, analyzed, and used to indicate proper operation or to diagnose problems.

FIG. 1 shows a standard arrangement for testing automotive computer networks. A host device communicates with an automobile 112 via a Vehicle Communications Interface, or "VCI," 110. The VCI 110 has a flexible design that enables it to communicate with different types of host computing devices, such as a laptop computer 116, a personal data assistant (PDA) 118, or a computer workstation 128. Other types of computing devices can be used. It can communicate with the host using different networking technologies, such as 10/100 Ethernet, IEEE 802.11 or Bluetooth.

The host computer (e.g., any of laptop 116, PDA 118, and workstation 120) need not be a specialized system. The host computer generally runs a mainstream operating system, such as Windows®, Linux, or PalmOS®. It generally communicates with the VCI 110 using TCP/IP, just as it does with other devices on its network or over the Internet.

FIG. 2 shows a block diagram of a conventional VCI 200. The VCI 200 can be used in in the standard arrangement of FIG. 1. The VCI 200 includes a CPU 210. The CPU 210 runs software for interacting with automotive networks. The CPU 210 can communicate with a host computer using a hard-wired connection (e.g., 10/100 Ethernet, 122), or using a wireless path (e.g., wireless LAN connection, 124).

The VCI 200 communicates with different types of automotive networks, to accommodate the configuration and diagnostic needs of various vehicles. It generally includes a number of Media Access Controllers, or "MACs." Each MAC is a digital circuit that supports 2-way communication with a particular network protocol. For example, the VCI 200 includes a CAN MAC 220, for communicating with CAN protocol, a UART MAC 222 for communicating with UART protocol, and a SAE J1850 MAC 224 for communicating with SAE J1850 protocol. The MACs are generally implemented as Application Specific Integrated Circuits (ASICs). A different ASIC is provided for each type of MAC. The types of MACs employed in a particular VCI 200 depends upon the types of networks the VCI communicates with. Therefore, the types of MACs may be different from those shown in FIG. 2, and the VCI 200 may include additional MACs.

The actual signals passed on an automotive network generally have voltage levels that are different from those produced or received for the respective MAC. Levels must therefore be shifted before they are sent out to the automotive network or before the MAC receives them. Physical shifters, CAN PHY 230, UART PHY 232, and SAE J1850 PHY 234, accomplish the requisite level shifting for both incoming and outgoing signals.

A Pin MUX 240 is provided at the output of the VCI 200 to route signals to appropriate conductors of the cable 114. This capability allows the VCI to accommodate access ports that have different pin assignments.

The VCI 200 sends messages out over an automotive network using generally the following process. In response to a directive from a host computer, the CPU 210 prepares a message for transmission over the automotive network. The CPU 210 sends data to the particular MAC that handles the type of automotive network to be used. For instance, if the automotive network to be used follows the CAN protocol, the CPU 210 outputs the message to the CAN MAC 220. The CAN MAC 200 processes the data from the CPU 210 and converts it into a format that is consistent with the CAN protocol. The CAN PHY 230 adjusts the levels of the signals provided by the CAN MAC 220, and the Pin MUX 240 routes the shifted signals to appropriate pins of the cable 114. The VCI 200 thus manages several tasks, including data generation, data formatting, physical level shifting, and physical pin assignments for transmitted messages.

The VCI 200 receives messages from the automotive network using generally the reverse of the process described above. A message arrives over the cable 114. The Pin MUX 40 routes the message to the appropriate level shifter, here CAN PHY 230. The level shifter changes the levels of the signals carrying the message to be consistent with the voltage levels of the CAN MAC 220. The CAN MAC 220 receives the shifted signals, which are expressed in the CAN protocol, and converts them to data, which are sent to the CPU 210. The CPU 210 interprets the received message and takes appropriate action. This may include sending a result back to the host computer.

It is well known that many transactions in automotive networks require real time responses. For example, the receipt of certain messages must be acknowledged within a set amount of time to prevent an error or some other undesirable condition. In the VCI 200, the CPU 210 has the task of generating the requisite response. The requirement to perform this task places certain constraints on the design of the CPU 210. For example, the CPU 210 must be able to respond to incoming messages substantially in real time. This means that the CPU 210 must generally run a Real Time Operating System (RTOS).

RTOS's involve certain drawbacks. For example, the mainstream operating systems on the market today are not RTOS's, and software programs developed for mainstream operating systems are not readily adaptable for running on RTOS's. Consequently, software is often required to be developed and maintained specifically for an RTOS by the VCI supplier. The lack of available software for RTOS's is particularly troublesome because new host technologies are frequently introduced, such as wireless LAN and USB. Supporting these technologies with a VCI running an RTOS thus requires frequent and intensive software efforts.

Another problem arises if Virtual Private Network (VPN) support is needed. Typically, this support is available only for mainstream operating systems and is not available for RTOS's.

To overcome these drawbacks, the VCI 300 of FIG. 3 has been proposed. The VCI 300 includes, as a component, the Conventional VCI 200 of FIG. 2. However, the VCI 300 also includes a VCI server 310 between the host and the Conventional VCI 200. The VCI server 310 communicates with the Conventional VCI 200 over a network, such as Ethernet. The VCI server 310 also communicates with the host and runs a mainstream operating system, such as Windows or Linux. The VCI server 310 can thus run mainstream software for supporting new networking technologies. It can also be configured with VPN. Because the VCI server 310 is interposed between the Conventional VCI 200 and the host, the task of networking to the host is moved from the Conventional VCI 200, where it is difficult to support, to the VCI server 310, where support is much more convenient. Custom RTOS implementations supporting new networking technologies are thus not required.

Although the VCI 300 greatly reduces the effort needed to incorporate new technologies, it significantly increases the cost of the VCI. The VCI server 310 is typically a microprocessor, which, along with the requisite memory and peripherals, adds at least $100 beyond the cost of the Conventional VCI 200. Diagnostic equipment for automobiles is highly cost sensitive, and the need for the added microprocessor reduces the appeal of an otherwise attractive solution.

What is needed is a VCI that provides the benefits of a mainstream operating system without the added cost.

BRIEF SUMMARY OF THE INVENTION

With the foregoing background in mind, it is an object of the invention for a vehicle communications interface to be economical and readily adaptable for use with new networking technologies.

To achieve the foregoing object, as well as other objectives and advantages, a vehicle communications interface includes a server coupled to a plurality of processors. Each processor includes a MAC (media access controller) for communicating with a respective vehicle network, according to a particular protocol, and a controller coupled to the MAC. The controller identifies incoming messages from the vehicle that require real time responses. It then provides these responses without the involvement of the server. Real time requirements of the vehicle communications interface are thus removed from the server, allowing the server to run a non-real time, mainstream operating system for which new technologies are readily available. Further, the MACs and controllers can be implemented at low cost, for example, using a Field Programmable Gate Array (FPGA).

BRIEF DESCRIPTION OF THE DRAWINGS

Additional objects, advantages, and novel features of the invention will become apparent from a consideration of the ensuing description and drawings, in which—

DETAILED DESCRIPTION OF THE PREFERRED EMBODIMENT

Figure 1:
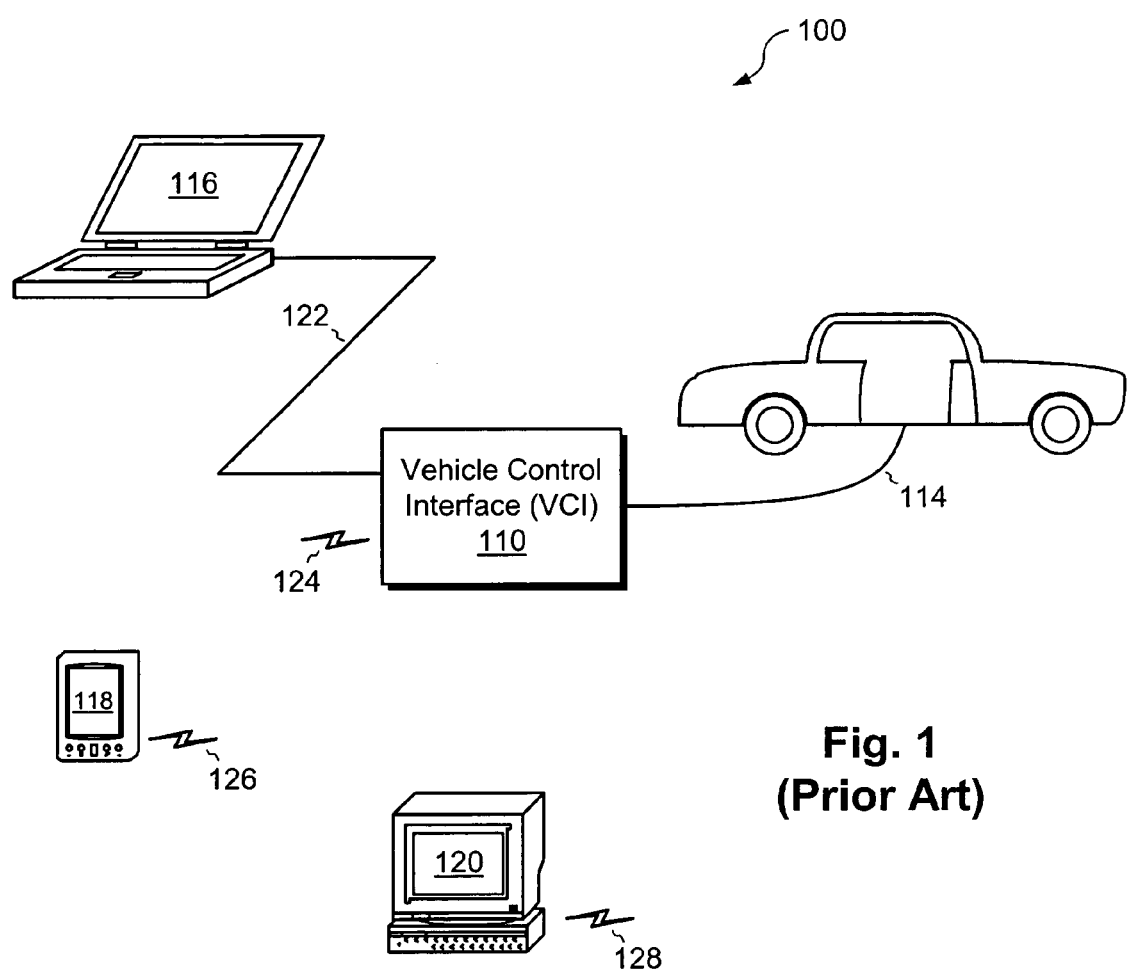
FIG. 1 is a simplified drawing of a conventional system for interfacing one or more host computers with a vehicle's computer networks via a device called a Vehicle Communications Interface, or VCI.
Figure 2:
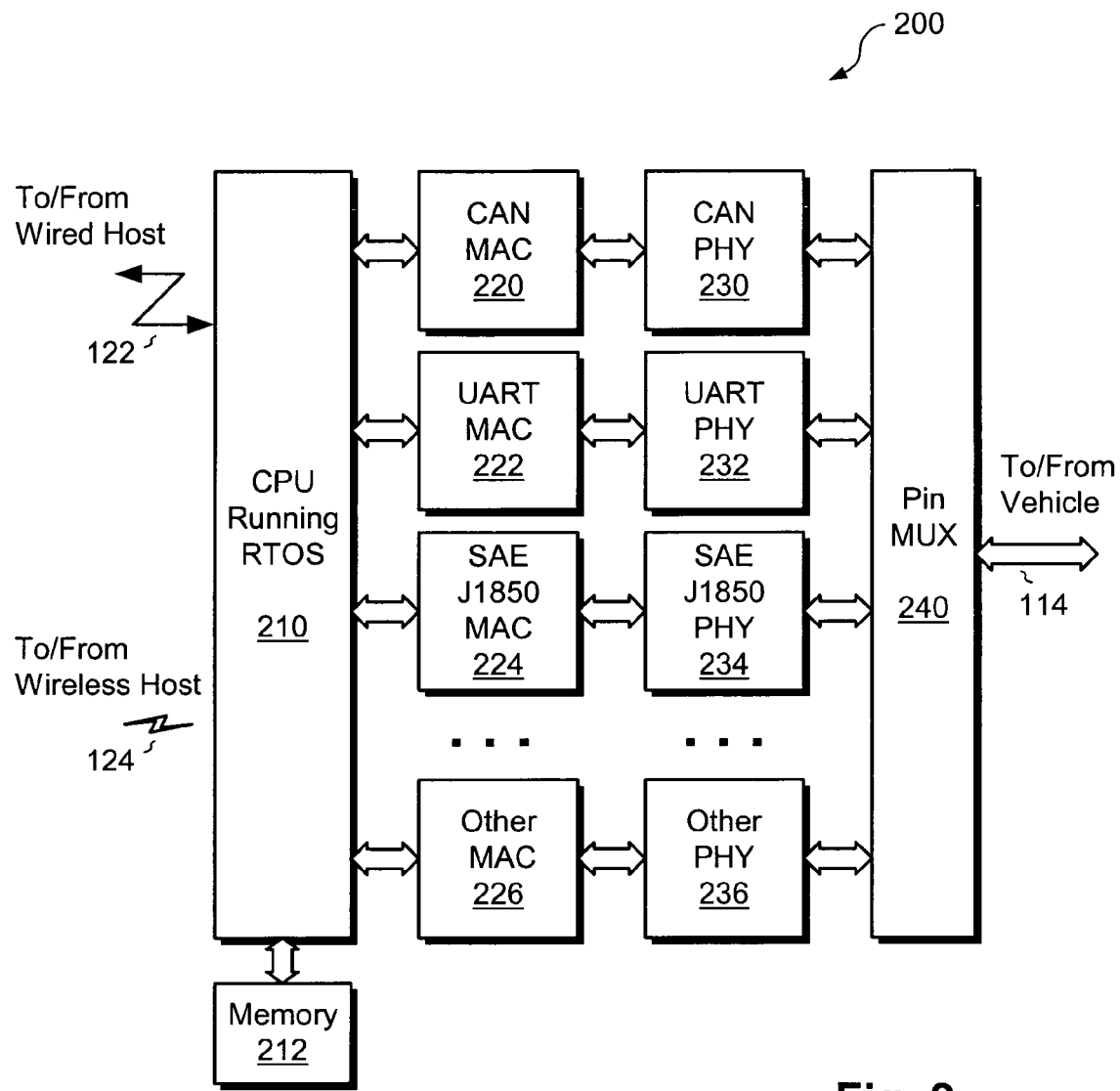
FIG. 2 is a block diagram of a conventional VCI, wherein a CPU runs a Real Time Operating System (RTOS) for managing communications with the vehicle's networks.
Figure 3:
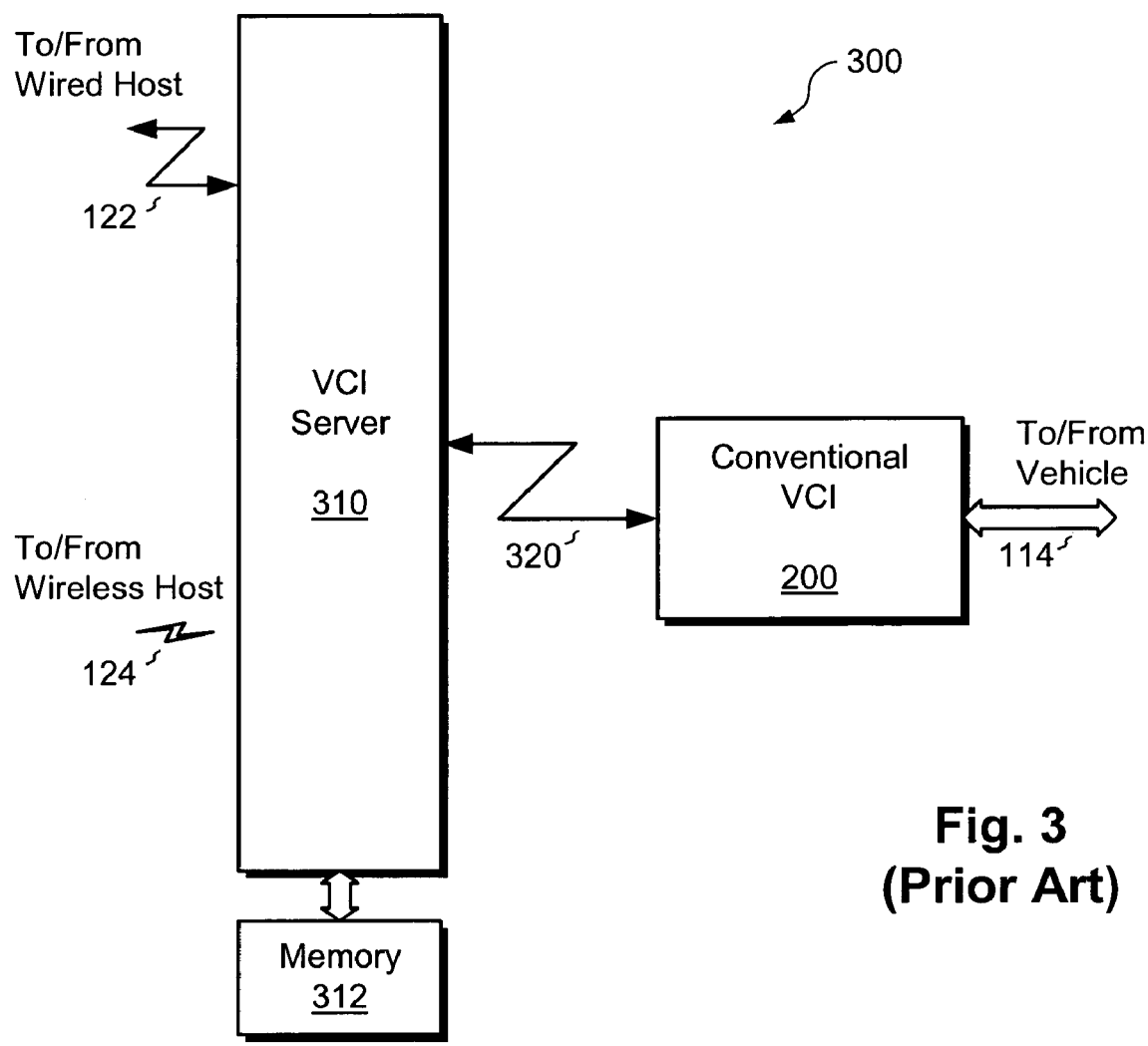
FIG. 3 is a block diagram of an improved conventional VCI, wherein a VCI server is placed between the conventional VCI of FIG. 2 and the one or more host computers of FIG. 1.
Figure 4:
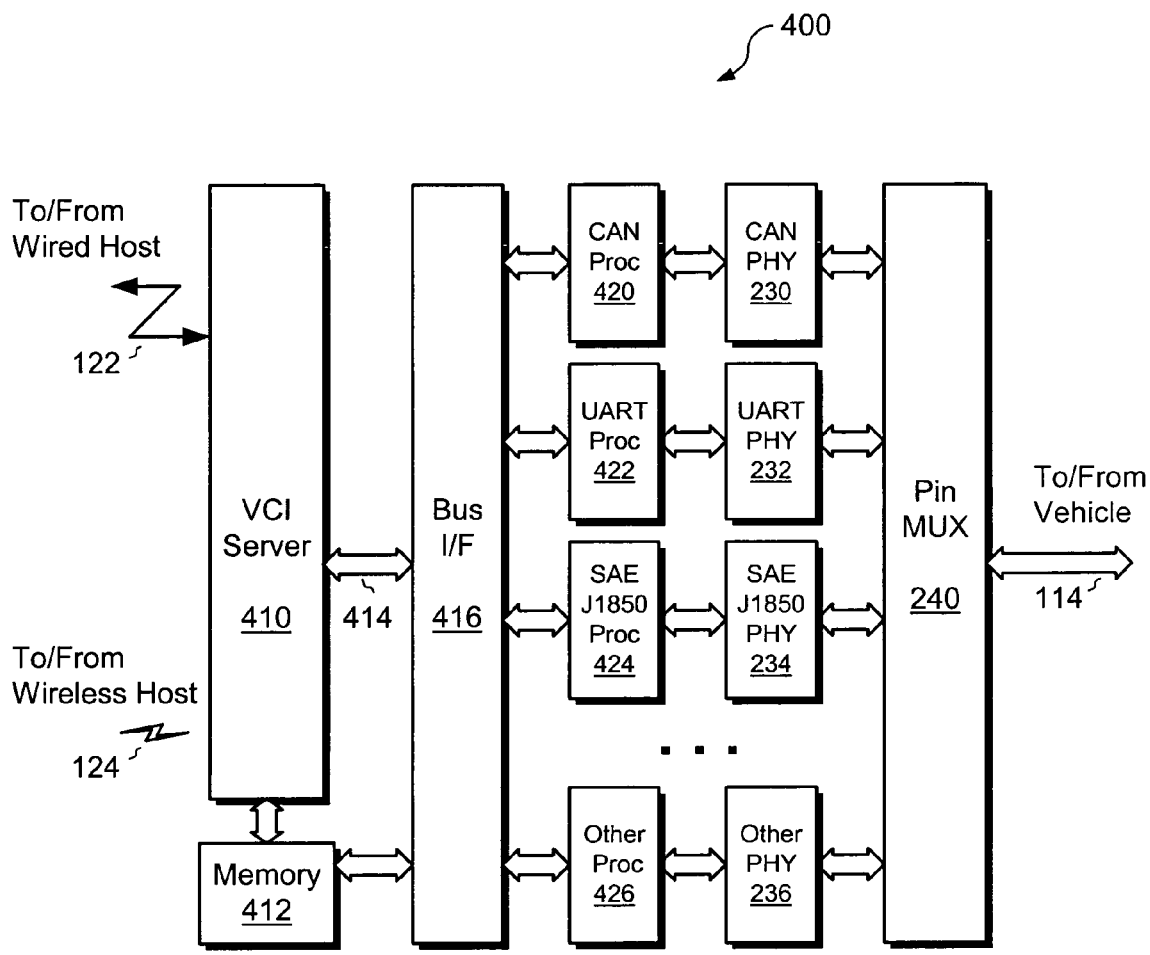
FIG. 4 is a block diagram of a VCI according to an embodiment of the invention, wherein a plurality of processors is shown.

FIG. 4 shows an improved VCI 400 according to an embodiment of the invention. The improved VCI 400 includes many elements that are similar to elements of prior VCI's. For instance, the level shifters 230-236 and the PIN MUX 240 of FIG. 4 are similar to the level shifters and PIN MUX shown in FIG. 2. Also, the VCI server 410 and memory 412 are generally similar to the VCI server 310 and memory 312 of FIG. 3.

The improved VCI 400 differs markedly from the prior art, however, in its use of processors 420-426. The VCI 400 employs different processors for communicating with different types of vehicle networks. For example, CAN Processor 230 is tailored for communication via CAN protocol, UART Processor 422 is tailored for communication via UART protocol, and so forth.

The processors 420-426 are digital circuits that convey signals between the level shifters 230-236 and the VCI server 410. Significantly, the processors handle time-sensitive tasks of vehicle communication on behalf of the VCI server 410. The processors thus relieve the VCI server 410 of the need to perform these time-sensitive tasks. Consequently, the VCI server 410 can run a mainstream operating system, such as Windows or Linux, rather than an RTOS, and can easily accommodate new networking technologies, VPN, and other products.

The improved VCI 400 also differs markedly from prior VCI's in its use of a bus interface 416. The bus interface 416 provides bus-level communication between the VCI server 410 and each of the processors 420-426, via a bus 414. As described in connection with FIG. 3, the prior art employs network-level communication with the VCI server. As is known, bus-level communication is generally faster than network-level communication. It also requires less overhead. Network-level communication, such as Ethernet, is relatively complex, and its implementation requires a great deal of processing power. By contrast, bus-level communication is usually simple and can be implemented with simple hardware. The lesser requirements of bus-level communication help to keep the performance requirements of the processors 420-426 low, and therefore help to implement the processors 420-426 at low cost. In the preferred embodiment, the bus 414 is a PCI bus, and the bus interface 416 is PCI Interface.

The VCI 400 has a memory 412 coupled to the VCI server 410. The memory 412 is also coupled to the bus interface 416. By virtue of this arrangement, processors 420-426 can read from and write to the memory 412 directly, without requiring any involvement of the VCI server 410.

Figure 5:
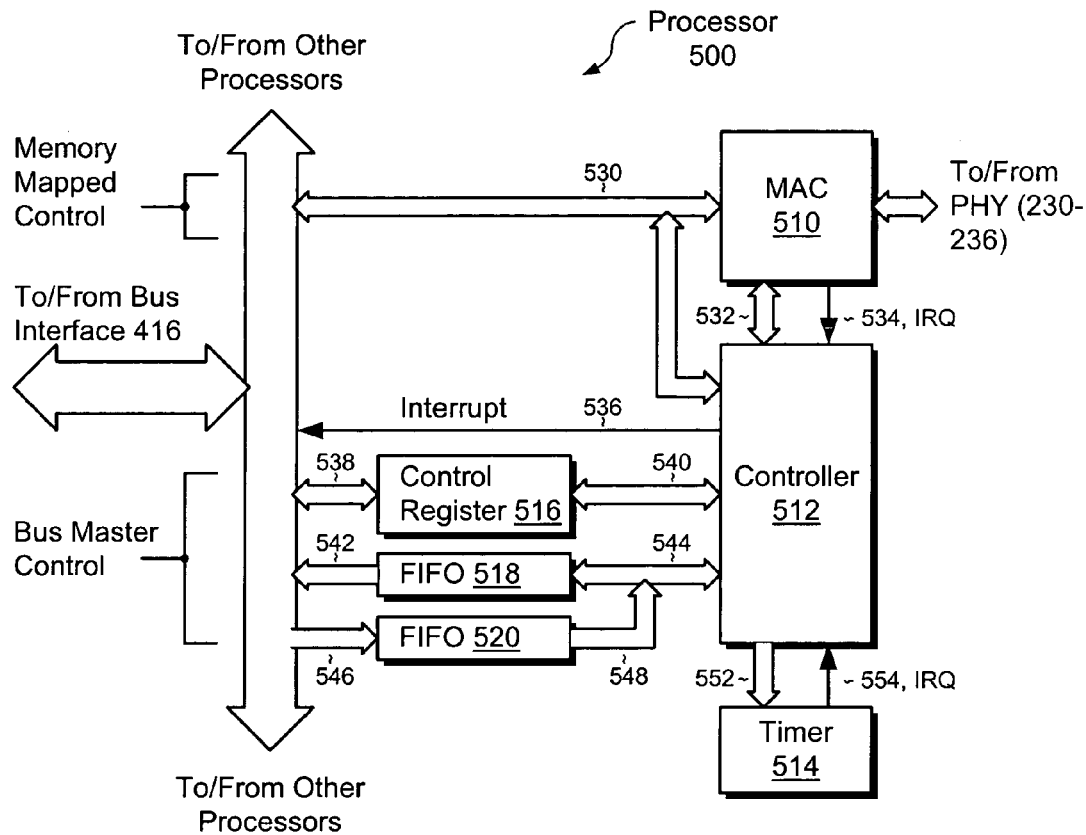
FIG. 5 is a block diagram of a generalized processor that is suitable for use in the VCI of FIG. 4.

FIG. 5 shows a generic processor 500. The processor 500 depicts in general form each of the network-specific processors 420-426. Although the VCI 400 employs different processors for communicating with different types of vehicle networks, all processors have the same general form. Each processor preferably includes a Media Access Controller (MAC) 510, a controller 512, a timer 514, a control register 516, and incoming and outgoing FIFO's, 518 and 520, respectively.

The MAC 510 for a particular vehicle network is preferably a standard MAC made for communicating with the vehicle network. For example, if the processor 500 is tailored for use with a CAN network, the MAC 510 is a CAN MAC, similar to the CAN MAC 220 of FIG. 2.

The controller 512 directs the operation of the processor 500. It preferably also acts as a conduit for incoming and outgoing messages. In the preferred embodiment, a timer 514 is coupled to the controller 512 for providing a real time reference. The MAC 510 and the timer 514 can preferably interrupt the controller 512 (via IRQ lines 534 and 554, respectively). The controller 512 can preferably interrupt the VCI server 410 (via interrupt line 536).

FIFO 518 accumulates message data received from a vehicle network in the order in which they are received. FIFO 520 accumulates message data to be sent out to the vehicle network in the order in which they are to be transmitted.

The control register 516 preferably contains pointers into the memory 412. For example, one pointer indicates a location in the memory 412 where the contents of the FIFO 518 can be written. Another pointer indicates a location in the memory from which the contents of the FIFO 520 can be read.

As is known, the PCI bus standard, as well as others, allows devices that use the bus to be "bus masters," temporarily granting them control over the bus. Preferably, the controller 512 is configurable as a bus master. In this mode, the controller 512 can directly read to or write from the memory 412, via the FIFO's 418 and 420, at the locations indicated by the control register 416. Reading and writing of the memory 412 can thus be conducted between the controller 512 and the memory 412, without involvement of the VCI server 410.

Figure 6:
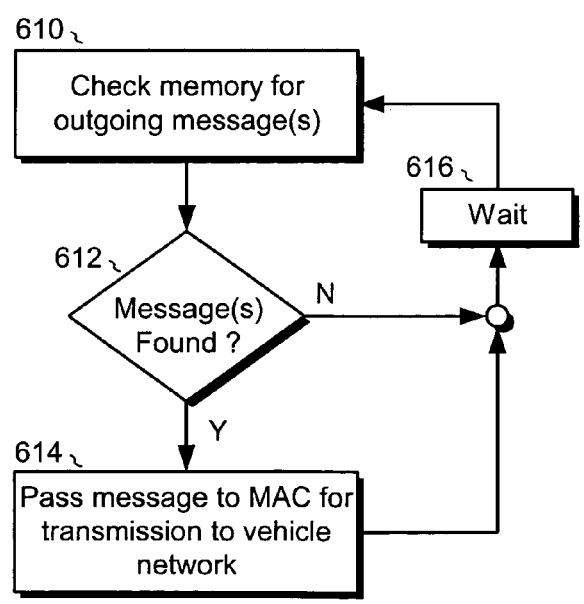
FIG. 6 is a flowchart showing a process according to an embodiment of the invention for transmitting messages to a vehicle network.

FIG. 6 summarizes the actions taken when the VCI 400 transmits messages to a vehicle network. Beginning at step 610, the controller 512 checks whether any messages are waiting to be sent. This step preferably entails the controller assuming bus master mode and transferring the contents of the memory 412, at a location indicated by the control register 416, to the FIFO 420.

At step 612, the controller 512 checks whether the FIFO 420 contains any messages. If not, the controller waits a short amount of time (step 616) and then checks again. It continues to check for messages indefinitely, until a message is found.

If any messages are found, the controller 512 proceeds to step 614. The controller directs the passage of any received messages to the MAC 510 and directs the MAC 510 to output the message(s). The MAC 510 outputs the message(s) in the proper network protocol. From there, message(s) are passed to a level shifter (one of 230-236), to the Pin Matrix 240, and out to the vehicle (see FIG. 4). Once again, the controller 512 waits a short time (step 616) and then resumes checking for new messages (step 612).

Significantly, the VCI server 410 performs no real time tasks during the transmission of messages to the vehicle network. Its role is simply to deposit message data into the memory 412. The controller 512 handles the remaining tasks. The timing of the VCI server's deposits into memory is not critical.

Figure 7:
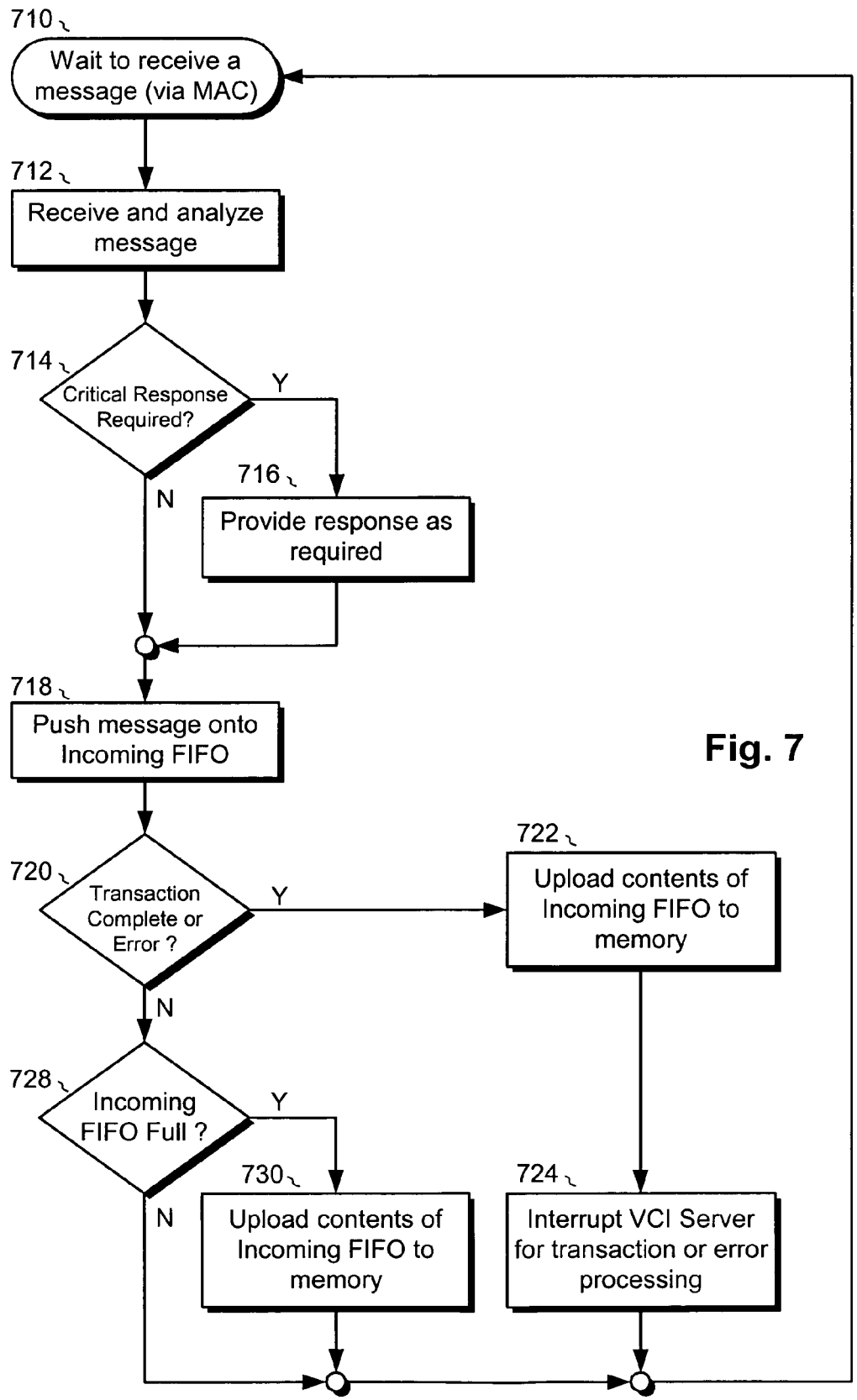
FIG. 7 is a flowchart showing a process according to an embodiment of the invention for receiving messages from a vehicle network.

FIG. 7 shows the actions taken when the VCI 400 is receiving messages from the vehicle network. Receipt of messages differs from transmission in that receipt requires time-critical responses. The VCI controller and associated hardware handle these responses, without requiring any time critical actions on the part of the VCI server 410.

Step 710 is a quiescent state, wherein the controller 512 waits to receive an incoming message from the vehicle network, via the MAC 510. When the MAC 510 receives a message, it preferably interrupts the controller 512. At step 712, the controller 512 promptly retrieves the newly arrived message from the MAC 510 and analyzes the message.

The controller 512 preferably employs a look-up table or other storage means (not shown) to assist in analyzing the message. The look-up table lists message types, for the protocol supported by the processor, which require critical responses. It also lists the nature of the responses they require. Certain messages for certain protocols require that an acknowledgement of receipt be sent within a narrow window of time. Other messages require than an acknowledgement be sent only after a specified number of messages have been received. The look-up table preferably associates message types with the required time and/or number of messages before a response is required.

At step 714, the controller determines whether the received message is of a type that requires a critical response. The controller preferably looks up the message type of the received message in the look-up table. If the message type requires a critical response, operation proceeds to step 716. If the response is time-critical, the controller 512 programs the timer 514 in an "alarm clock" fashion, by specifying an interval of time before the response is to be delivered. When the timer 514 expires, it interrupts the controller 512. The controller then provides the required response. Again, the response is generally in the form of a simple acknowledgement. If the response must be provided within a specified number of messages, the controller counts received messages and responds when the required count is attained. It should be appreciated that different types of vehicle networks have different requirements for responses. Some require time-critical responses, whereas others require responses within a specified number of messages. As this description is generic to all types of processors, both are discussed. It should also be appreciated that critical responses, whether they are based on time or a number of messages, are provided entirely by the controller 512 and associated hardware, without the involvement of the VCI server 410.

Regardless of whether a critical response is required, operation next proceeds to step 718, whereupon the controller 512 pushes the received message onto the FIFO 518.

For many protocols, messages form parts of larger communication structures called transactions. For instance, a "message" in CAN protocol is 8 bytes long, whereas a "transaction" is defined as a 4K block of messages. In addition, certain protocols indicate whether an error has occurred during the exchange of a message in a field within the message itself. Preferably, the controller 512 counts the messages received and thus can determine whether a transaction is complete. It can also preferably determine whether an incoming message indicates that an error has occurred.

At step 720, the controller 512 checks whether the newly received message completes a transaction. It also checks whether an error has occurred. If either of these conditions is true, operation proceeds to step 722. There, the controller 512 uploads the contents of the FIFO 518 to the memory 412. In performing this step, the controller 512 preferably assumes bus master mode. The contents of the FIFO 518 are written directly to the memory 412, at the location specified in the control register 516. This step preferably occurs without the intervention of the VCI server 410.

Because completed transactions and errors typically require a response, eventually, the controller 512 interrupts the VCI server 410 at step 724. The VCI server 410 responds generally by reading the uploaded messages from the memory 414 and taking appropriate action. The response of the VCI server 410 to the interrupt is not time-critical. Upon completion of step 724, operation resumes at step 710, whereupon the controller 512 waits to receive another message.

If the newly received message does not mark the end of a transaction or indicate an error (at step 720), the controller proceeds to step 728 to check whether the FIFO 518 is full. If the FIFO is full (i.e., has reached its storage capacity), the controller uploads the contents of the FIFO 518 to the memory (step 730), using the same process described in connection with step 722 above. Once the messages are uploaded, the controller once again assumes a wait state, as shown in step 710.

Having described both transmitting and receiving network exchanges, it is apparent that the processor 500 handles all real time activities associated with vehicle network communication, and that the VCI server 410 performs no real time activities. Therefore, the VCI server 410 is not required to run an RTOS and is free to run any operating system the VCI manufacturer chooses to use.

The VCI server 410 still plays a role in vehicle network communications, however. For example, the VCI server 410 prepares network messages to be sent to the processors 500. It also reads back messages that are received. To perform these functions, the VCI server 410 preferably runs a software program called a "driver." The driver includes functions for sending and receiving messages to and from the various processors 500.

In the preferred embodiment, the driver also includes one or more functions for initializing the processors 500. The initialization functions preferably download configuration data to each processor 500 over the bus 414. The PCI bus supports memory mapped access to devices on the bus. The initialization function preferably uses this memory mapped mode to configure each processor.

The tasks required of the controller 512 can be performed with relatively simple hardware. Preferably, the controller 512 is a state machine. Although the processes for transmitting and receiving messages are shown in two separate flow charts, those skilled in the art of digital circuit design can readily implement both processes in a single state machine. Alternatively, two state machines may be used: one for transmitting messages and one for receiving messages.

The controller 512 is preferably implemented with an 8-bit microprocessor. Although an 8-bit microprocessor has more capability than the tasks of the controller 512 require, it is simple to implement and can be provided at low cost.

A significant advantage of the VCI 400 is its ability to be made at low cost. The bus interface 416 and processors 420-426, including their respective MAC's 510 and support circuitry, can be realized together on a single FPGA. Each of these components is commercially available as a program description, which can be licensed and downloaded from the manufacturer for inclusion in an FPGA. To reduce cost even further, the VCI server 410 and memory 414 can also be embedded in the FPGA, or provided in an additional FPGA.

Another advantage of the VCI 400 is its flexibility. FPGAs can be reconfigured, even in the field, simply by downloading new configuration data. New hardware configurations can be stored in the VCI software driver. Therefore, upgrading the VCI hardware is accomplished simply by upgrading the driver.

Having described one embodiment, numerous alternative embodiments or variations can be made. For example, as described herein, the VCI 400 communicates with a host computer, such as a laptop, workstation, or PDA. This is not strictly required, however. Alternatively, the VCI 400 can be run as a stand-alone device, with the VCI server 410 managing the tasks previously allocated to the host. According to one variation, the VCI server 410 is itself a laptop computer, workstation, PDA, or the like. The other components of the VCI 400 (bus interface, processors, shifters, and pin mux) are provided on a card or module that plugs into the VCI server 410 and accesses its bus.

The improved VCI has been shown and described for use with automobiles. However, it can readily be used with any transportation vehicle that includes computer networks.

Therefore, while the invention has been particularly shown and described with reference to the preferred embodiments thereof, it will be understood by those skilled in the art that various changes in form and detail may be made therein without departing from the spirit and scope of the invention.

What is claimed is:

1. A device for communicating between a host computer and different types of vehicle networks via different vehicle network protocols, the device comprising:
   a server, capable of being networked to the host computer, for preparing network messages to be sent to and reading messages from a plurality of processors;
   the plurality of processors, coupled to the server, each of the plurality of processors is constructed and arranged to exchange the messages with each of the vehicle networks in accordance with each of the different vehicle network protocols, wherein the each of the plurality of processors includes a controller for monitoring the messages received from the each of the vehicle networks and providing a real time response to the messages that require the real time response without intervention of the server;

a queue for accumulating the messages received from the each of the vehicle networks; and the controller for uploading the accumulated messages from the queue to a memory, coupled to the server via the bus interface, in response to a predetermined event without intervention of the server.

2. A device as recited in claim 1, further comprising the memory coupled to the bus interface, wherein the memory is accessible by any of the plurality of processors without intervention of the server.

3. A device as recited in claim 1, wherein the bus interface is a PCI bus interface.

4. A device as recited in claim 1, wherein each processor further comprises a media access controller (MAC) for enabling communication in a native protocol of a vehicle network.

5. A device as recited in claim 4, wherein the controller is coupled between the MAC and the server for conveying messages between the MAC and the server.

6. A device as recited in claim 5, wherein the digital circuit further comprises an incoming message buffer coupled between the controller and the server for accumulating messages received from a vehicle network.

7. A device as recited in claim 5, wherein the digital circuit further comprises an outgoing message buffer coupled between the server and the controller for receiving data from the server.

8. A device as recited in claim 5, wherein the digital circuit further comprises a timer, coupled to the controller, for providing an indication that a designated interval of time has elapsed.

9. A device as recited in claim 1, wherein the server is loaded with an operating system other than a real time operating system (RTOS).

10. A device as recited in claim 1, wherein the plurality of processors is realized as at least one Field Programmable Gate Array (FPGA).

11. A device as recited in claim 1, wherein the server and the plurality of processors are realized together in a single Field Programmable Gate Array (FPGA).

12. A device for communicating with different types of vehicle computer networks in a vehicle, the device comprising:

a server for preparing network messages to be sent to and reading messages from a plurality of processors;

the plurality of processors, coupled to the server, different ones of the plurality of processors constructed and arranged to exchange the messages with the different types of vehicle computer networks according to different vehicle network protocols, wherein each of the plurality of processors includes:

means for identifying the messages arriving from each of the vehicle computer networks that require a real time response;

means, operative in response to an identification to the identifying step that the messages require the real time response, for providing the real time response without intervention of the server; and means for uploading the messages from a queue to a memory, coupled to the server via a bus interface, in response to a predetermined event without intervention of the server.

13. A device as recited in claim 12, wherein the real time response comprises an acknowledgement transmitted to the vehicle that a message has been received.

14. A device as recited in claim 12, wherein the means for providing a real time response comprises means for providing a response within a predetermined interval of time.

15. A device as recited in claim 12, wherein the means for providing a real time response comprises means for providing a response within a predetermined number of received messages.

16. A device as recited in claim 12, wherein the server is one of a laptop computer, a computer workstation, and a personal data assistant.

17. A device as recited in claim 12, wherein the server and the plurality of processors are realized together in a single Field Programmable Gate Array (FPGA).

18. A method for communicating between a device and a plurality of vehicle networks of computers in a vehicle via different vehicle network protocols, the method comprising:

connecting the device to the plurality of vehicle networks;

receiving messages, by each of a plurality of processors of the device, from the each of the vehicle networks in each of the different vehicle network protocols;

identifying, by the each of the plurality of processors the messages arriving from the each of the vehicle networks that require a real time response;

in response to the identifying step that the messages require the real time response, providing, by the each of a plurality of processors, the real time response;

accumulating, by a queue, the messages received from the each of the vehicle networks;

uploading, by a controller of the each of the plurality of processors, the accumulated, received messages from the queue to a memory, coupled to a server included in the device via a bus interface, responsive to a predetermined event without intervention of the server; and reading the message by the server of the device.

19. A method as recited in claim 18, wherein the predetermined event is a detection of an error on the network.

20. A method as recited in claims 18, wherein the predetermined event is an indication that a network transmission is complete.

21. A method as recited in claims 18, wherein the predetermined event is an indication that available memory for storing messages has reached its capacity.

* * * * *